(12) United States Patent
Obana

(10) Patent No.: US 6,530,410 B1
(45) Date of Patent: Mar. 11, 2003

(54) PNEUMATIC RADIAL TIRE

(75) Inventor: Naohiko Obana, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/460,729

(22) Filed: Dec. 14, 1999

(30) Foreign Application Priority Data

Dec. 14, 1998 (JP) .......................................... 10-355058

(51) Int. Cl.$^7$ ................................................. B60C 9/06
(52) U.S. Cl. ...................... 152/527; 152/451; 152/556; 152/526; 57/212; 57/213; 57/902
(58) Field of Search .......................... 57/212, 213, 311, 57/902, 9, 206, 216, 236, 237; 152/526, 451, 527, 556; 216/100, 108, 52, 53

(56) References Cited

U.S. PATENT DOCUMENTS

| | | | | |
|---|---|---|---|---|
| 4,836,262 A | * | 6/1989 | Nishizawa et al. | 152/451 |
| 4,938,015 A | * | 7/1990 | Kinoshita | 57/200 |
| 5,223,060 A | * | 6/1993 | Imamiya et al. | 152/451 |
| 5,285,623 A | | 2/1994 | Baillievier et al. | |
| 5,490,551 A | * | 2/1996 | Prakash et al. | 152/556 |
| 5,520,233 A | * | 5/1996 | Umezawa | 152/527 |
| 5,584,169 A | * | 12/1996 | Ikehara | 57/212 |
| 5,603,208 A | * | 2/1997 | Fujita et al. | 57/200 |
| 5,606,852 A | * | 3/1997 | Yanagisawa | 57/207 |
| 5,676,776 A | * | 10/1997 | Ikehara | 152/527 |
| 5,687,557 A | | 11/1997 | De Vos et al. | |
| 5,779,829 A | * | 7/1998 | Prakash et al. | 152/540 |
| 6,102,095 A | * | 8/2000 | Obana et al. | 152/527 |

FOREIGN PATENT DOCUMENTS

EP         1010548 A2  *  6/2000

* cited by examiner

*Primary Examiner*—Edward J. Cain
*Assistant Examiner*—Katarzyna W. Lee
(74) *Attorney, Agent, or Firm*—Sughrue Mion, PLLC

(57) ABSTRACT

As the present invention there is disclosed a pneumatic radial tire comprising a carcass having a smaller tensile rigidity than that of conventional pneumatic radial tires by application of a steel cord having a smaller Young's modulus to the carcass or by application of a smaller amount of a high strength steel cord formed with carcass filaments having a greater tensile strength to the carcass while maintaining the necessary strength of the carcass. In accordance with the present invention, extension of the carcass increases and extension of a belt in the circumferential direction of the tire is suppressed when the tire is inflated by an inner pressure. As a result, compression stress working on the carcass when a vehicle turns decreases and buckling deformation of the steel cord can be prevented. Accordingly, durability is improved. The amount of the cord required to maintain the strength of the carcass can be decreased by application of the high strength steel cord, thereby decreasing weight of the tire.

17 Claims, 4 Drawing Sheets

F I G. 3
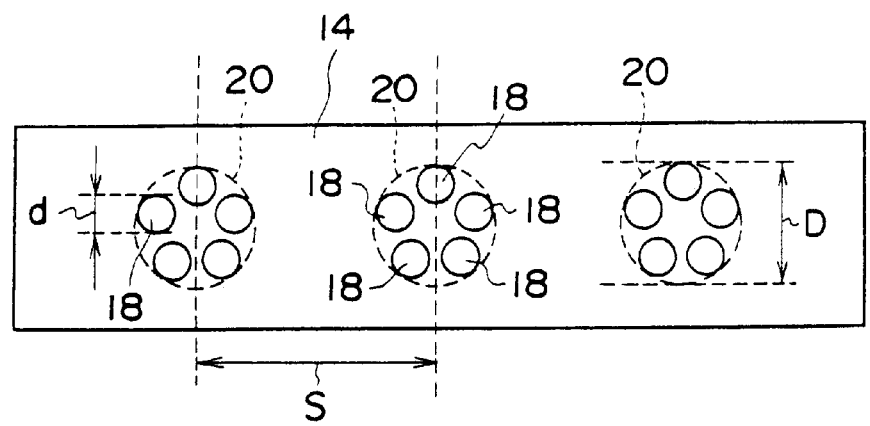
F I G. 4
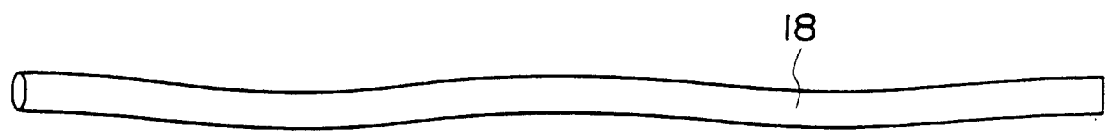

PNEUMATIC RADIAL TIRE

BACKGROUND OF THE INVENTION

1. Field of the Invention

The present invention relates to a pneumatic radial tire, particularly to a pneumatic radial tire for passenger cars, having a decreased weight and exhibiting excellent durability, riding comfort and controllability.

2. Description of the Related Art

Conventionally, steel cords have been used for carcasses of pneumatic radial tires for trucks and busses.

On the other hand, in general, organic fibers have been used for the carcass of pneumatic radial tires for passenger cars. As the organic fiber, polyesters are mainly used and rayon and nylon are occasionally used.

The reason why organic fibers have been used for the carcass of pneumatic radial tires for passenger cars can be considered to be as follows.

When a tire for passenger cars and a tire for trucks and busses are compared, reinforcement of the tire for passenger cars with a belt is smaller and the tire for passenger cars is used at a lower inner pressure. Greater compression stress works on the carcass of the tire for passenger cars because passenger cars undergo greater movement during turns. Therefore, when a tire having a steel cord in place of an organic fiber is prepared with the tire designed in a manner such that the strength of the carcass is kept the same, the steel cord having greater rigidity is fractured by the greater compression stress described above. For the above reason, organic fibers having less rigidity than that of steel cords have been used.

Recently, decreasing the weight of vehicles and saving fuel are required from the standpoint of energy saving and environmental protection. As for tires, the weight and rolling resistance are being decreased. From this standpoint, there have been attempts to convert the reinforcing material for the carcass of pneumatic radial tires from organic fibers to steel cords, to decrease the amount of the cord while maintaining the strength of the tire by increasing the strength of the carcass.

However, as described above, when a steel cord is used for a carcass of a pneumatic radial tire for passenger cars, the steel cord is subjected to repeated compression stress during rolling of the tire and buckling deformation of the steel cord takes place when the vehicle turns. Therefore, durability of the carcass deteriorates.

SUMMARY OF THE INVENTION

The present invention has been made under the above circumstances and an object of the present invention is to provide a pneumatic radial tire for passenger cars which can suppress deterioration in durability of a carcass which takes place due to buckling deformation when a steel cord is applied to the carcass of the pneumatic radial tire, which has a decreased weight due to application of a high strength steel cord and which exhibits improved riding comfort and controllability.

In a first aspect of the present invention, a pneumatic radial tire comprising a pair of bead portions, and a carcass as a skeletal component of the tire, constituted of a ply of radially disposed cords and extending in a toroidal form between the pair of bead portions, wherein the carcass including circumferentied steel cords, each steel cord having at least one steel filament, with a tensile rigidity, EL, the EL satisfying an equation (1) as follows:

$$1300 \leq EL(\text{kgf/mm}^2) \leq 2400$$

$$EL = EC \times FA/(D \times S) \quad (1)$$

wherein

EC is the Young's modulus of the steel cord (kgf/mm$^2$);

FA is the total sectional area of the filament forming the steel cord (mm$^2$);

D is the diameter of the steel cord (mm); and

S is the pitch between the steel cords that are adjacent in a crown portion (mm).

In accordance with the first aspect of the present invention, tensile rigidity of the carcass is kept smaller than that of conventional carcasses by application of the steel cord having a smaller Young's modulus to the carcass. Thus, buckling deformation of the steel cord is prevented and durability is improved.

In cases where the tensile rigidity of the carcass is kept smaller than that of conventional carcasses using steel cords, when the tire is inflated by an inner pressure tensile stress toward an outer side in the transverse direction of the tire works also on the carcass, and extension of the carcass becomes greater than that of conventional carcasses having higher tensile rigidity. As the result, tension toward the outer side in the transverse direction of the tire occurs also on the belt disposed in the direction perpendicular to the direction of the carcass cord. Thus, compressing input force toward the inner side in the transverse direction of the tire is alleviated even when such compressing input force is applied at the belt when the vehicle turns, and extension of the belt in the circumferential direction of the tire is suppressed. In other words, when the vehicle turns, compression stress is not generated at the steel cords in the carcass at the inner side of the equatorial plane of the tire (with respect to the turn in the tire) attached at the outer side of the vehicle with respect to the turn and durability of the carcass is improved.

In a second aspect of the present invention, tensile strength, TS, of the steel filament in the steel cord satisfies an equation (2) as follows:

$$TS(\text{kgf/mm}^2) \leq 230 - 148 \log d \quad (2)$$

wherein d is diameter of the steel filament (mm); and log is common logarithm.

In accordance with the second aspect of the present invention, a high strength steel cord formed with steel filaments having a great tensile strength is used for the carcass. As a result, input force (tensile stress) per unit sectional area of the steel filament forming the steel cord increases when tensile force works on the carcass and the extension (elongation) increases. In other words, tensile rigidity of the carcass decreases. As the result, durability is improved due to the decrease in tensile rigidity of the carcass.

The amount of the cord necessary for maintaining the required strength of the carcass is decreased by the application of the high strength steel cord and the weight of the tire can be decreased.

In a third aspect of the present invention, the diameter of the steel filament in the steel cord is 0.10 to 0.32 mm.

When the diameter of the steel filament is smaller than 0.10 mm, bending rigidity of the carcass decreases to decrease rigidity of a side portion of the pneumatic radial tire excessively and controllability deteriorates. Although increasing tensile strength of the steel filament is advantageous in terms of decreasing the weight of the pneumatic radial tire, manufacturing productivity in the process of stretching the filament decreases, which is economically disadvantageous. When the diameter of the steel filament exceeds 0.32 mm, bending rigidity of the carcass increases excessively and riding comfort deteriorates.

Therefore, when the diameter of the steel filament forming the steel cords is 0.10 to 0.32 mm, rigidity of the carcass can be decreased to a suitable degree to improve durability, and excellent controllability and riding comfort can also be achieved.

BRIEF DESCRIPTION OF THE DRAWINGS

FIG. 3 shows a diagram exhibiting the pitch between adjacent steel cords in a carcass, in a cross section along the equatorial line of a tire.

FIG. 4 shows a side view of a steel filament formed into a helical shape.

DESCRIPTION OF THE PREFERRED EMBODIMENT

Figure 1:
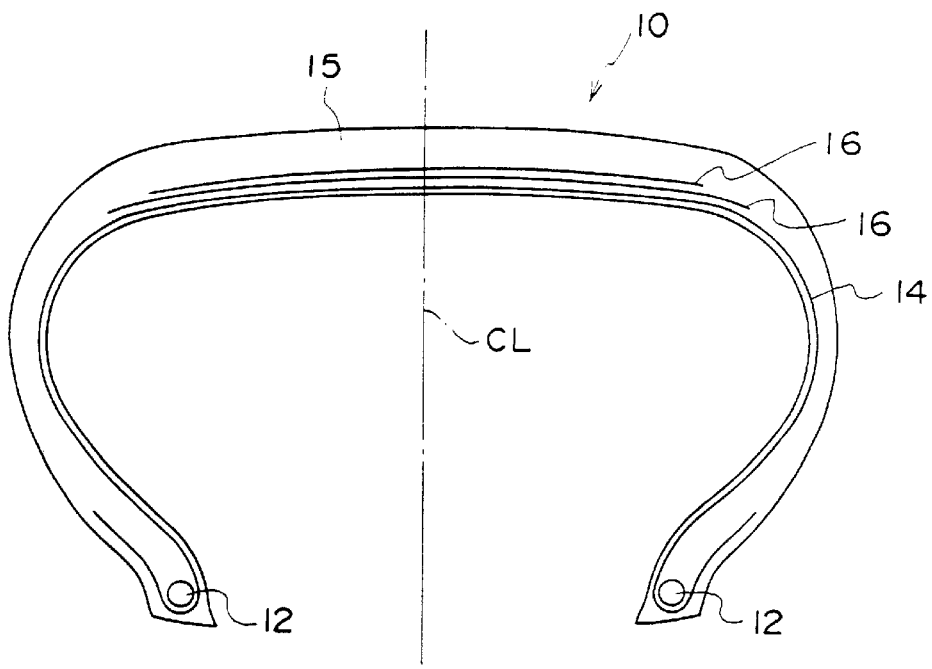
FIG. 1 shows a cross section of a pneumatic radial tire of an embodiment of the present invention.

A pneumatic radial tire of an embodiment of the present invention will be described with reference to FIG. 1.

The pneumatic radial tire 10 comprises a carcass 14 which is a ply of cords disposed in the radial direction of the tire and which extends in a toroidal form between a pair of beads 12 and belts 16 disposed at a crown portion 15 at an outer side of the carcass 14 in the radial direction of the tire. In the carcass 14, steel cords 20 comprising at least one steel filament 18 (five filaments in FIG. 3) are disposed parallel to each other with a prescribed pitch between them.

The (strike) pitch S between adjacent steel cords at the crown portion is the pitch (distance) between the centers of adjacent steel cords 20 in the carcass 14 in the cross section along the equatorial line of the tire (refer to FIG. 3). In FIG. 3, D and d indicate diameters of the steel cord 20 and the steel filament 18, respectively.

The pneumatic radial tire 10 of the present embodiment is characterized in that tensile rigidity of the carcass 14 comprising the steel cord 20 is kept within an appropriate range to improve durability of the carcass.

The appropriate range of tensile rigidity of the carcass 14 in the present embodiment is defined as follows: tensile rigidity EL of the carcass satisfies following equation (1):

$$1300 \leq EL(\text{kgf/mm}^2) \leq 2400$$

$$EL = EC \times FA/(D \times S) \quad (1)$$

wherein

EC is the Young's modulus of the steel cord (kgf/mm$^2$);
FA is the total sectional area of the filament forming the steel cord (mm$^2$);
D is the diameter of the steel cord (mm); and
S is the pitch between the steel cords that are adjacent in a crown portion (mm).

The reason why the carcass characterized as described above exhibits excellent durability will be described in the following When a steel cord is used for a carcass of a pneumatic tire for passenger cars, in general, a carcass cord becomes fractured under a belt and durability of the tire deteriorates. This phenomenon was analyzed and the following result was obtained.

Tensile force in the circumferential direction of the tire works on a belt in a pneumatic radial tire when the tire is inflated by an inner pressure. When a vehicle turns, a particularly great tensile stress works on the portion at the inner side of the equatorial plane of the tire (with respect to the turn in the tire) attached at the outer side of the vehicle with respect to the turn. When the tensile stress working on a belt is great, the belt extends greatly in the circumferential direction of the tire and contracts in the transverse direction of the tire. At the same time, a great compression stress works on steel cords of the carcass disposed in the direction perpendicular to the direction of the belt. When the compression stress works on the steel cords, even under a compression input which can be easily absorbed by organic fibers, local bending deformation, i.e., so-called buckling deformation, of the steel cords takes place to absorb the compression stress by deformation, due to the steel cords having greater rigidity under compression than organic fibers. The buckling deformation causes fracture of the steel cords to deteriorate durability of the carcass.

In the present invention, based on the above result of the analysis, buckling deformation of steel cords is prevented by decreasing tensile rigidity of the carcass to improve durability.

To decrease tensile rigidity of the carcass, a steel cord having a smaller Young's modulus is applied in the carcass. The reason is that a decrease in the Young's modulus of the steel cord used for reinforcing the carcass should decrease tensile rigidity of the carcass.

In cases where the tensile rigidity of the carcass is kept smaller than that of carcasses having conventional steel cords as described above, when the tire is inflated by an inner pressure, tensile stress in the transverse direction of the tire works also on the carcass and the carcass extends to a greater degree than conventional carcasses having higher tensile rigidity. As a result, tension in the transverse outer direction of the tire works on the belt disposed perpendicular to the carcass cord. Therefore, even when compressing input force works on the belt toward the inner side in the transverse direction of the tire at the time when the vehicle turns, the compressing input force is alleviated and extension of the belt in the circumferential direction of the tire is suppressed. In other words, extension of the belt in the circumferential direction of the tire, which is the greatest cause of buckling deformation of conventional steel cords, can be suppressed. Therefore, when the vehicle turns, no compression stress works on the steel cord in the carcass at the inner side of the equatorial place of the tire (with respect to the direction of the turn in the tire) attached at the outer side of the vehicle with respect to the direction of the turn. Thus, durability of the carcass is improved.

It is preferable that tensile rigidity EL of the carcass is in the range of 1,300 to 2,400 kgf/mm$^2$. When tensile rigidity EL of the carcass is less than 1,300 kgf/mm$^2$, the amount of the steel cord used in the carcass must be decreased to a great extent and it becomes difficult for the strength required for the carcass to be maintained. The strength required for the carcass can be maintained by increasing tensile strength of the steel filament constituting the steel. However, increasing the tensile strength of the steel filament causes a great decrease in the manufacturing productivity in the step of stretching the filament and is therefore economically disadvantageous. When the tensile rigidity EL of the carcass exceeds 2,400 kgf/mm$^2$, the tensile rigidity of the carcass becomes as high as that of carcasses having conventional steel cords and compression stress works repeatedly on the steel cord during rotation of the tire. Thus, the buckling deformation of the steel cord takes place at the time when the vehicle turns, deteriorating durability.

In the present embodiment, it is defined that tensile rigidity EL of the carcass 14 be in the range of 1,300 to 2,400 kgf/mm$^2$. Durability of the carcass 14 is improved under this condition.

In the present embodiment, tensile strength TS of the steel filament 18 forming the steel cord 20 satisfies the following equation (2):

$$TS(\text{kgf/mm}^2) \geq 230 - 148 \log d \qquad (2)$$

wherein
d is diameter of the steel filament (mm); and
log is common logarithm.

When the high strength steel cord formed with the steel filaments having a great tensile strength is used for the carcass, input force (tensile stress) per unit sectional area of the steel filament forming the steel cord increases when tensile force works on the carcass and the extension (elongation) increases. In other words, tensile rigidity of the carcass decreases. As a result, durability is improved due to the decrease in tensile rigidity of the carcass.

The amount of the cord necessary for maintaining the required strength of the carcass is decreased by the application of the high strength steel cord and the weight of the tire can be decreased.

In the present embodiment, the diameter of the steel filament 18 forming the steel cord 20 is 0.10 to 0.32 mm.

When the diameter of the steel filament is smaller than 0.10 mm, bending rigidity of a carcass decreases to decrease rigidity of a side portion of the pneumatic radial tire excessively and thus controllability deteriorates. Although increasing tensile strength of the steel filament is advantageous in terms of decreasing the weight of the pneumatic radial tire, manufacturing productivity in the process of stretching the filament decreases, which is economically disadvantageous. When the diameter of the steel filament exceeds 0.32 mm, bending rigidity of the carcass excessively increases and riding comfort deteriorates.

Therefore, when the diameter of the steel filament 18 forming the steel cord 20 is 0.10 to 0.32 mm, rigidity of the carcass 14 can be decreased to a suitable degree to improve durability, and excellent controllability and riding comfort can also be achieved.

By application of the steel cord 20 having a smaller Young's modulus to the carcass 14 or by application of a smaller amount of the high strength steel cord 20 formed with steel filaments 18 having a great tensile strength to the carcass while maintaining the necessary strength of the carcass, the tensile rigidity of the carcass 14 can be made smaller than that of a carcass using a conventional steel cord and durability can be improved.

A steel cord comprising a single steel filament which is held in the original straight form may be applied in the carcass. To decrease tensile rigidity of the carcass, it is preferable that the steel filament is formed into a helical shape (refer to FIG. 4) or a waved shape (refer to FIG. 6).

The structure of a steel cord formed with two or more steel filaments is not particularly limited. It is preferable that the steel cord has an open twist structure in which adjacent steel filaments are disposed with a pitch between them, or that at least one steel filament is formed into a helical shape or a waved shape having a pitch smaller than a pitch of twisting in the steel cord, because penetratability of rubber increases and tensile rigidity of the carcass decreases.

It is not necessary that all the steel filaments forming the steel cord have the same diameter. However, to increase productivity of the steel cord, it is preferable that all the steel filaments have the same diameter.

As described above, durability of a carcass of a pneumatic tire, particularly a pneumatic radial tire for passenger cars, to which a steel cord is applied, depends significantly on the tensile rigidity of the carcass. The smaller the tensile rigidity of the carcass, the better the durability.

To further improve durability of the steel cord, it is preferable that the residual stress at a surface layer of the steel filament forming the steel cord is compression stress.

EXAMPLES

For pneumatic radial tires for passenger cars of the size 205/60R15 having two layers of belt in which a steel cord is used as the reinforcing material, carcasses were prepared by application of various types of steel cords. The results of experiments using the tires having these carcasses are shown in Tables 1 to 3.

TABLE 1

| Example | 1 | 2 | 3 | 4 | 5 | 6 | 7 |
|---|---|---|---|---|---|---|---|
| Number of carcasses | 1 | 1 | 1 | 1 | 1 | 1 | 1 |
| Cord structure | 1×1×0.31 | 1×2×0.30 | 1×3×0.20 | 1×4×0.175 | 1×5×0.15 | 1+4×0.19 | 1+5×0.18 |
| Tensile strength of filament (kgf/mm$^2$) | 435 | 400 | 410 | 420 | 425 | 390 | 420 |
| Strength of cord (kg) | 32 | 55 | 37 | 39 | 36 | 55 | 63 |
| Diameter of steel cord (mm) | 0.47 | 0.60 | 0.52 | 0.51 | 0.49 | 0.57 | 0.54 |
| Number of cords per unit width of ply (150 mm) | 37.5 | 22.0 | 32.3 | 31.0 | 33.4 | 22.0 | 18.9 |
| Pitch between adjacent steel cords in crown portion (mm) | 1.33 | 2.28 | 1.55 | 1.61 | 1.50 | 2.28 | 2.64 |
| Tensile rigidity of carcass (kgf/mm$^2$) | 2373 | 2000 | 2264 | 2254 | 2323 | 2159 | 2116 |
| Durability of carcass cord | good | good | good | good | good | good | good |
| Riding comfort (index) | 100 | 100 | 105 | 107 | 110 | 106 | 107 |

TABLE 1-continued

| Example | 1 | 2 | 3 | 4 | 5 | 6 | 7 |
|---|---|---|---|---|---|---|---|
| Controllability (index) | 107 | 111 | 104 | 102 | 100 | 104 | 104 |
| Weight of carcass (index) | 67 | 74 | 72 | 71 | 70 | 73 | 68 |

TABLE 2

| Example | 8 | 9 | 10 | 11 | 12 | 13 |
|---|---|---|---|---|---|---|
| Number of carcasses | 1 | 1 | 1 | 1 | 1 | 1 |
| Cord structure | 1+6× 0.14 | 2+2× 0.175 | 2+3× 0.17 | 3+2× 0.20 | 3+3× 0.16 | 3+4× 0.12 |
| Tensile strength of filament (kgf/mm$^2$) | 430 | 405 | 385 | 400 | 380 | 440 |
| Strength of cord (kg) | 46 | 38 | 43 | 61 | 45 | 34 |
| Diameter of steel cord (mm) | 0.48 | 0.70 | 0.68 | 0.83 | 0.66 | 0.50 |
| Number of cords per unit width of ply (/50 mm) | 26.1 | 31.4 | 28.0 | 19.6 | 26.7 | 34.8 |
| Pitch between adjacent steel cords in crown portion (mm) | 1.91 | 1.59 | 1.79 | 2.55 | 1.87 | 1.44 |
| Tensile rigidity of carcass (kgf/mm$^2$) | 2345 | 1693 | 1833 | 1444 | 1900 | 2188 |
| Durability of carcass cord | good | good | good | good | good | good |
| Riding comfort (index) | 111 | 107 | 107 | 105 | 108 | 113 |
| Controllability (index) | 100 | 109 | 107 | 114 | 105 | 100 |
| Weight of carcass (index) | 66 | 71 | 75 | 73 | 76 | 65 |

TABLE 3

| Comparative Example | 1 | 2 | 3 | 4 | 5 | 6 |
|---|---|---|---|---|---|---|
| Number of carcasses | 1 | 1 | 1 | 1 | 1 | 1 |
| Cord structure | 1×2× 0.25 | 1×3× 0.22 | 1×4× 0.20 | 1×5× 0.15 | 1+5× 0.19 | 2+3× 0.175 |
| Tensile strength of filament (kgf/mm$^2$) | 290 | 320 | 280 | 300 | 300 | 280 |
| Strength of cord (kg) | 28 | 36 | 34 | 26 | 50 | 33 |
| Diameter of steel cord (mm) | 0.50 | 0.47 | 0.48 | 0.41 | 0.57 | 0.70 |
| Number of cords per unit width of ply (/50 mm) | 43.2 | 33.7 | 35.2 | 46.4 | 23.8 | 36.4 |
| Pitch between adjacent steel cords in crown portion (mm) | 1.16 | 1.48 | 1.42 | 1.08 | 2.10 | 1.37 |
| Tensile rigidity of carcass (kgf/mm$^2$) | 3310 | 3164 | 3550 | 3949 | 2807 | 2449 |
| Durability of carcass cord | poor | poor | poor | poor | poor | fair |
| Riding comfort (index) | 100 | 102 | 103 | 107 | 104 | 105 |
| Controllability (index) | 100 | 100 | 97 | 92 | 100 | 103 |
| Weight of carcass (index) | 100 | 91 | 105 | 97 | 95 | 103 |

In the above experiments, tensile rigidity, durability of a carcass cord, riding comfort, controllability and the weight of the carcass were compared among the tires of the Examples and the Comparative Examples. Items of evaluation in the experiment are described in the following.

(1) Tensile Rigidity

Figure 2:
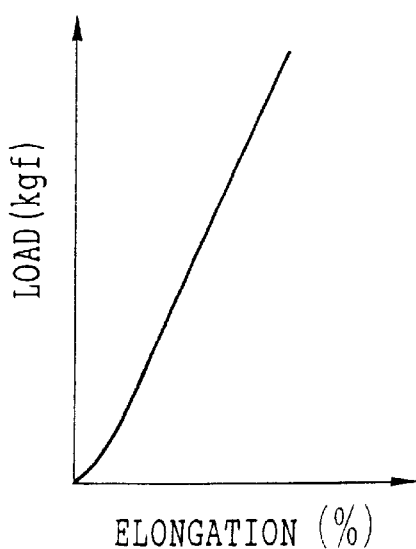
FIG. 2 shows a diagram exhibiting the relation between elongation and the applied load in the tensile test of a steel cord.

A steel cord embedded in a carcass (in the condition in which the steel cord was covered with rubber) was subjected to a tensile test and the relation between the elongation and the applied load such as that shown in FIG. 2 was obtained. Young's modulus of the steel cord was obtained from the slope of the curve and the tensile rigidity was obtained in accordance with equation (1) described in claim 1.

(2) Durability of Carcass Cord

Tires inflated by an inner pressure of 2.0 kgf/cm$^2$ were attached to an ordinary passenger car. The passenger car was driven on a test course and side force was applied, and thereafter, fracturing of steel cords in the carcass was examined. When no cords were fractured, the result was evaluated as good. When some of the cords were fractured, the result was evaluated as fair. When all of the cords were fractured, the result was evaluated as poor.

(3) Riding Comfort

Tires inflated by an inner pressure of 2.0 kgf/cm$^2$ were attached to an ordinary passenger car. The riding comfort was evaluated and expressed as a number based on the impression of the driver while driving the passenger car on a test course. The result is expressed as an index based on the value obtained in Comparative Example 1, which was set at 100. The greater the value, the better the riding comfort.

(4) Controllability

Tires inflated by an inner pressure of 2.0 kgf/cm$^2$ were attached to an ordinary passenger car. The controllability was evaluated and expressed as a number based on the impression of the driver while driving the passenger car on a test course. The result is expressed as an index based on the value obtained in Comparative Example 1, which was set at 100. The greater the value, the better the controllability.

(5) Weight of Carcass

The weight of the steel cords embedded in the carcass is expressed as an index based on the value obtained in Comparative Example 1, which was set at 100. The smaller the value, the more reduced the weight.

As clearly shown in the results in Tables 1 and 2, the tires of the present invention in Examples 1 to 13 all showed more excellent durability than that of the tire in Comparative Example 1 and exhibited riding comfort and controllability which were the same as or more excellent than those of the tire in Comparative Example 1. The tires of the present invention showed advantageous results with respect to reducing the weight of the tire as well.

Figure 5:
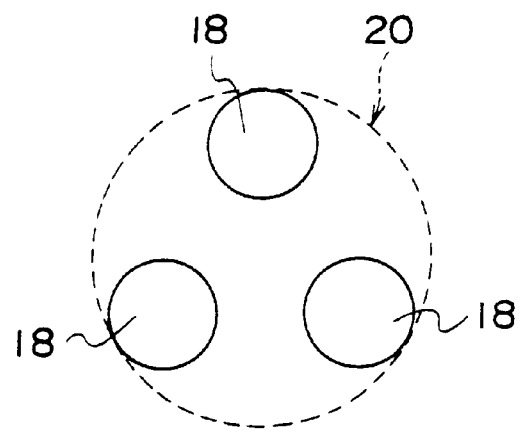
FIG. 5 shows a cross section of the steel cord used in Example 3.
Figure 6:
FIG. 6 shows a side view of a steel cord filament formed into a waved shape.
Figure 7:
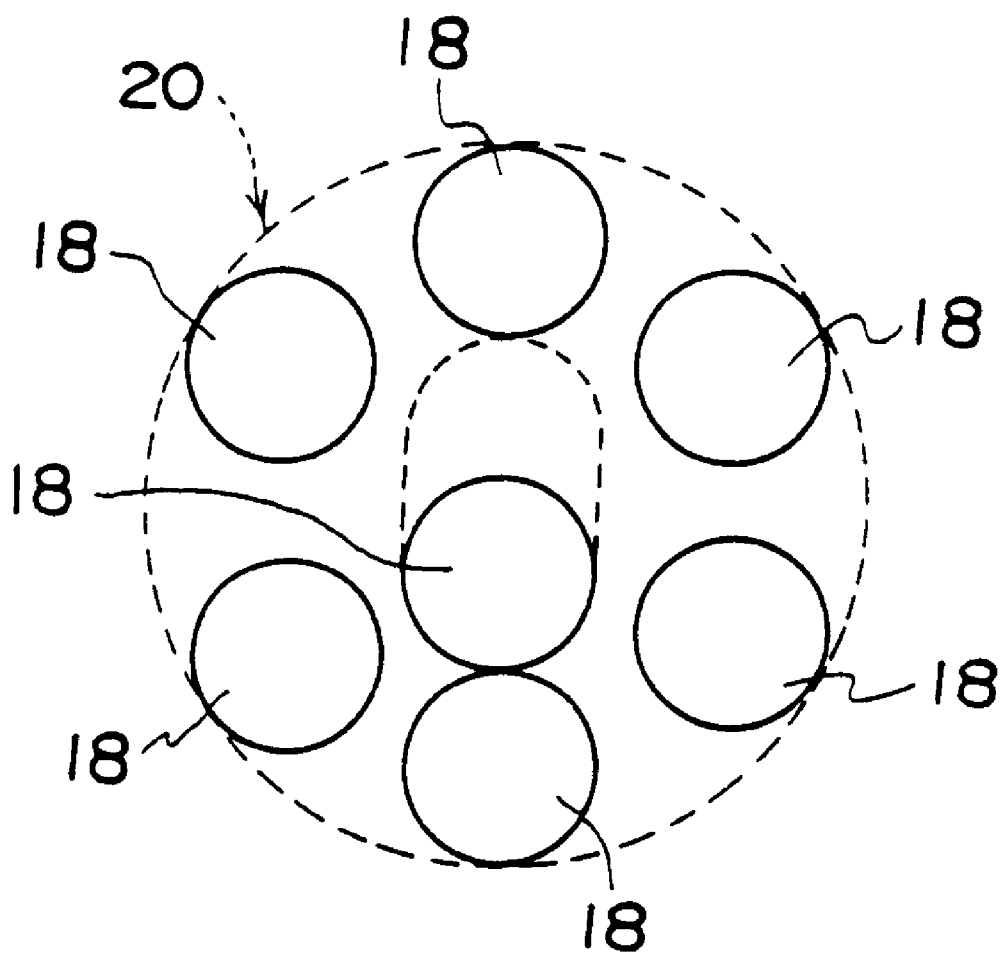
FIG. 7 shows a cross section of the steel cord used in Example 8.

The cord used in Example 1 had the structure shown in FIG. 4 which comprised a single steel filament formed into a helical shape. The cords used in Examples 3 to 5 had the structures in which adjacent filaments are disposed with a pitch between them. As a typical example of these cords, the cross-section of the cord used in Example 3 is shown in FIG. 5. The cord used in Example 8 had the structure in which the core filament was formed into a waved shape as shown in FIG. 6 and a sheath of 6 filaments was twisted around the core filament. The cross-section of this cord is shown in FIG. 7.

Tires of Comparative Examples 1 to 6 shown in Table 3 all had carcasses having very great tensile rigidity and showed inferior durability of carcass cords. Particularly, the tire of Comparative Example 3 had a carcass having particularly great tensile rigidity and the controllability was inferior to that of the tire of Comparative Example 1. Moreover, the tensile strength of the steel filament in this tire was very small and the weight of the carcass was greater than that of the tire of Comparative Example 1. The tire of Comparative Example 4 had a carcass having particularly great tensile rigidity and showed inferior controllability to that of the tire of Comparative Example 1. The tire of Comparative Example 6 had a steel filament having a small tensile strength and the weight of a carcass thereof was greater than that of the tire of Comparative Example 1.

As described above, the pneumatic radial tire of the present invention which satisfies the aforementioned conditions exhibits an excellent balance of durability of the carcass cord, riding comfort and controllability and, moreover, the weight of the tire can be decreased.

In the above examples, tensile rigidity of the carcass was decreased and durability was improved by the use of the high strength steel cord in decreased amounts in a carcass. Similar effects can be obtained by the use of a cord having a smaller tensile rigidity such as a highly stretched steel cord twisted at a greater angle.

To summarize the advantages of the present invention, by application of the steel cord in the carcass having the above characteristics, a pneumatic radial tire exhibiting more excellent durability and controllability than those of tires using organic fibers in the carcass can be provided. Particularly, a pneumatic radial having a decreased weight and exhibiting excellent riding comfort can be provided by adjusting tensile rigidity of the carcass, tensile strength of the steel filament or the diameter of the steel filament in respective prescribed ranges.

What is claimed is:

1. A pneumatic radial tire, comprising;
   a pair of bead portions, and
   a carcass as a skeletal component of the tire, constituted of a ply of radially disposed cords and extending in a toroidal form between the pair of bead portions, wherein
   the carcass including circumferentied steel cords, each steel cord having at least one steel filament, with a tensile rigidity, EL, the EL satisfying an equation (1) as follows:

$$1300 \leq EL(kgf/mm^2) \leq 2400$$

$$EL = EC \times FA/(D \times S) \quad (1)$$

wherein
   EC is the Young's modulus of the steel cord ($kgf/mm^2$);
   FA is the total sectional area of the filament forming the steel cord ($mm^2$);
   D is the diameter of the steel cord (mm); and
   S is the pitch between the steel cords that are adjacent in a crown portion (mm).

2. A pneumatic radial tire according to claim 1, wherein tensile strength, TS, of the steel filament in the steel cord satisfies an equation (2) as follows:

$$TS(kgf/mm^2) \geq 230 - 148 \log d \quad (2)$$

wherein
   d is the diameter of the steel filament (mm); and
   log is common logarithm.

3. A pneumatic radial tire according to claim 2, wherein the diameter of the steel filament constituting in the steel cord is 0.10 to 0.32 mm.

4. A pneumatic radial tire according to claim 3, wherein the steel filament in the steel cord is formed into a helical shape to decrease tensile rigidity of the carcass.

5. A pneumatic radial tire according to claim 3, wherein the steel filament in the steel cord is formed into a waved shape to decrease tensile rigidity of the carcass.

6. A pneumatic radial tire according to claim 3, wherein each steel cord includes a single steel filament and the steel filament of the steel cord is formed into a helical shape to decrease tensile rigidity of the carcass.

7. A pneumatic radial tire according to claim 3, wherein each steel cord includes a single steel filament and the steel filament of the steel cord is formed into a waved shape to decrease tensile rigidity of the carcass.

8. A pneumatic radial tire according to claim 4, wherein, each steel cord includes at least two steel filaments, with each steel cord having an open twist structure in which adjacent steel filaments have a gap between them.

9. A pneumatic radial tire according to claim 5, wherein, each steel cord includes at least two steel filaments, with each steel cord having an open twist structure in which adjacent steel filaments have a gap between them.

10. A pneumatic radial tire according to claim 4, wherein each steel cord includes at least two steel filaments twisting around one another, the twisting having a pitch, each of said steel filaments being formed into a shape selected from the group consisting of: a helical shape and a waved shape, each shape having a pitch smaller than the pitch of the twisting.

11. a pneumatic radial tire according to claim 5, wherein each steel cord includes at least two steel filaments twisting around one another, the twisting having a pitch, each of said steel filaments being formed into a shape selected from the group consisting of: a helical shape and a waved shape, each shape having a pitch smaller than the pitch of the twisting.

12. A pneumatic radial tire comprising:
    a pair of bead portions, and
    a carcass as a skeletal component of the tire, constituted of a ply of radially disposed cords and extending in a toroidal form between the pair of bead portions, the carcass including steel cords that each have at least one steel filament, tensile strength of the steel filament forming the steel cord satisfying the following equation (2):

$$TS(kgf/mm^2) \geq 230 - 148 \log d \quad (2)$$

wherein
    d is the diameter of the steel filament (mm); and
    log is common logarithm, wherein tensile rigidity, EL, of the carcass satisfies an equation (1) as follows:

$$1300 \leq EL(kgf/mm^2) \leq 2400$$

$$EL = EC \times FA/(D \times S) \quad (1)$$

wherein
    EC is the Young's modulus of the steel cord ($kgf/mm^2$);
    FA is the total sectional area of the filament forming the steel cord ($mm^2$);
    D is the diameter of the steel cord (mm); and
    S is the pitch between the steel cords that are adjacent in a crown portion (mm).

13. A pneumatic radial tire according to claim 12, wherein the diameter of the steel filament constituting the steel cord is 0.10 to 0.32 mm.

14. A pneumatic radial tire for use on a vehicle, the tire comprising:
    a pair of bead portions,
    a carcass as a skeletal component of the tire, which extends in toroidal form between the pair of bead portions, and
    a belt disposed in the carcass at the outer side of the carcass in a radial direction of the tire,
    wherein tensile rigidity of the carcass is set so that, when the tire is inflated, tensile force in a transverse outer direction of the tire works on the carcass and the carcass is sufficiently extended toward an outer side in a transverse direction of the tire, so that when a vehicle turns, causing application of tensile stress on the belt in a circumferential direction of the tire and compressing input force on the belt toward an inner side of the belt in the transverse direction of the tire, tensile stress toward the outer side in the transverse direction of the tire is sufficient for alleviating the compressing input force on the belt, wherein the carcass includes steel cords having at least one steel filament, with a tensile rigidity, EL, the EL satisfying an equation (1) as follows:

$$1300 \leq EL(kgf/mm^2) \leq 2400$$

$$EL = EC \times FA/(D \times S) \tag{1}$$

wherein

EC is the Young's modulus of the steel cord (kgf/mm$^2$);

FA is the total sectional area of the filament forming the steel cord (mm$^2$);

D is the diameter of the steel cord (mm); and

S is the pitch between the steel cords that are adjacent in a crown portion (mm).

15. A pneumatic radial tire according to claim 14, wherein the carcass includes steel cords having at least one steel filament, a tensile strength, TS, of the steel filament in the steel cord satisfying an equation (2) as follows;

$$TS(kgf/mm^2) \geq 230 - 148 \log d \tag{2}$$

wherein d is the diameter of the steel filament (mm); and log is common logarithm.

16. A pneumatic radial tire according to claim 14, wherein the diameter of the steel filament in the steel cord is 0.10 to 0.32 mm.

17. A pneumatic radial tire according to claim 15, wherein the diameter of the steel filament in the steel cord is 0.10 to 0.32 mm.

* * * * *